US009638932B2

(12) United States Patent
Strenz

(10) Patent No.: US 9,638,932 B2
(45) Date of Patent: May 2, 2017

(54) DEVICE AND METHOD FOR DIRECTLY SECURING AT LEAST ONE TEMPLE, HINGE, AND/OR BRIDGE OF AN EYEGLASS FRAME TO AT LEAST ONE EYEGLASS LENS OF RIMLESS GLASSES

(71) Applicant: INOMITEC GMBH & CO. KG, Vilshofen (DE)

(72) Inventor: Michael Strenz, Passau (DE)

(73) Assignee: Inomitec GmbH & Co. KG, Vilshofen (DE)

( * ) Notice: Subject to any disclaimer, the term of this patent is extended or adjusted under 35 U.S.C. 154(b) by 0 days.

(21) Appl. No.: 14/766,817

(22) PCT Filed: Feb. 11, 2014

(86) PCT No.: PCT/DE2014/100048
§ 371 (c)(1),
(2) Date: Aug. 10, 2015

(87) PCT Pub. No.: WO2014/124636
PCT Pub. Date: Aug. 21, 2014

(65) Prior Publication Data
US 2015/0378170 A1 Dec. 31, 2015

(30) Foreign Application Priority Data
Feb. 14, 2013 (DE) .................. 10 2013 101 458

(51) Int. Cl.
*G02C 1/02* (2006.01)
*G02C 1/00* (2006.01)
(Continued)

(52) U.S. Cl.
CPC ................ *G02C 1/02* (2013.01); *G02C 1/10* (2013.01); *G02C 5/12* (2013.01); *G02C 5/22* (2013.01); *G02C 13/001* (2013.01)

(58) Field of Classification Search
CPC . G02C 1/02; G02C 1/023; G02C 1/10; G02C 5/146
(Continued)

(56) References Cited

U.S. PATENT DOCUMENTS 289,740 A * 12/1883 Willson et al. .......... G02C 1/02
351/148
5,847,800 A 12/1998 Tachibana
(Continued)

FOREIGN PATENT DOCUMENTS

EP 2 019 331 A1 1/1999
WO 2007/028893 A2 3/2007
WO 2007/104414 A1 9/2007

*Primary Examiner* — Huy K Mai
(74) *Attorney, Agent, or Firm* — Jason D. Voight

(57) ABSTRACT

The invention relates to a device and method for directly securing at least one temple (3.1, 3.2), end-piece (3.6, 3.7) and/or bridge (3.3) of a spectacle frame (3) to at least one spectacle lens (2, 2') of rimless spectacles (1), wherein the at least one spectacle lens (2, 2') has at least one edge recess (5, 5', 5", 5''') which extends along the transverse axis (QA) of the spectacle lens (2, 2'). Particularly advantageously, in the edge recess (5, 5', 5", 5''') a securing body (6, 6', 6", 6''') is accommodated in a positively fitting manner and is firmly connected to the spectacle lens (2, 2'), wherein the securing body (6, 6', 6", 6''') has a bush-like receiving channel (7) extending along the transverse axis (QA), and the temple (3.1, 3.2), the end-piece (3.6, 3.7) and/or the bridge (3.3) of the spectacle frame (3) have at least one plug-like connection section (8) which can be inserted into the bush-like receiving channels (7) to produce a detachable plug-type connection.

14 Claims, 7 Drawing Sheets

(51) Int. Cl.
*G02C 5/12* (2006.01)
*G02C 5/22* (2006.01)
*G02C 13/00* (2006.01)

(58) Field of Classification Search
USPC .................. 351/110, 140, 142–152, 154
See application file for complete search history.

(56) References Cited

U.S. PATENT DOCUMENTS

| | | | |
|---|---|---|---|
| 7,926,936 B2* | 4/2011 | Sasamata | G02C 1/02 |
| | | | 351/149 |
| 2002/0135732 A1* | 9/2002 | Fujita | G02C 1/02 |
| | | | 351/110 |
| 2010/0296044 A1 | 11/2010 | Kawamoto | |

* cited by examiner

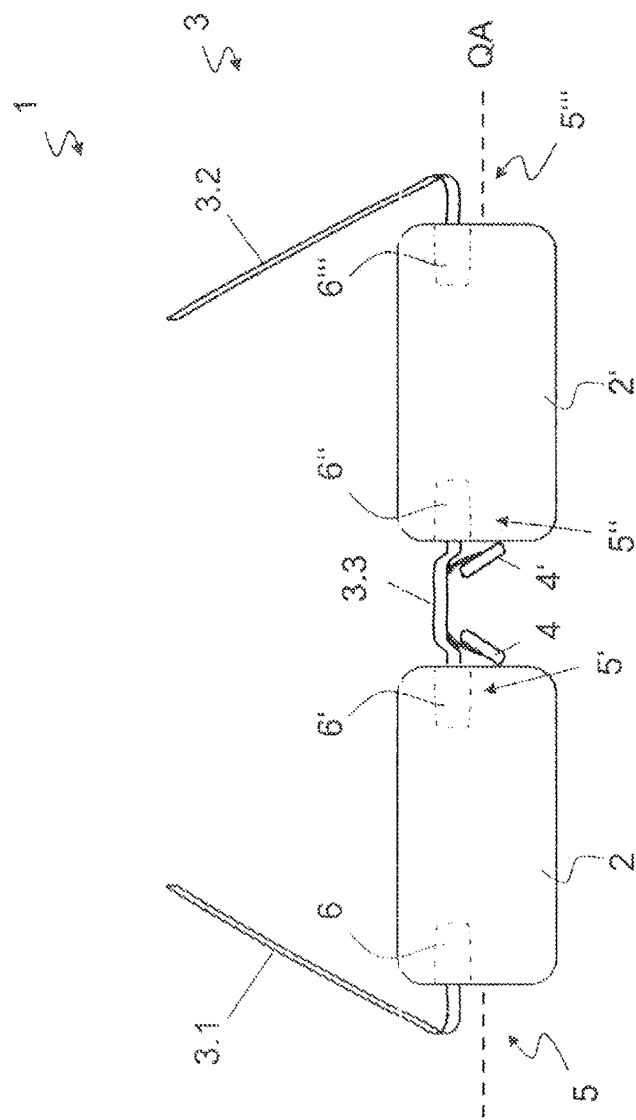

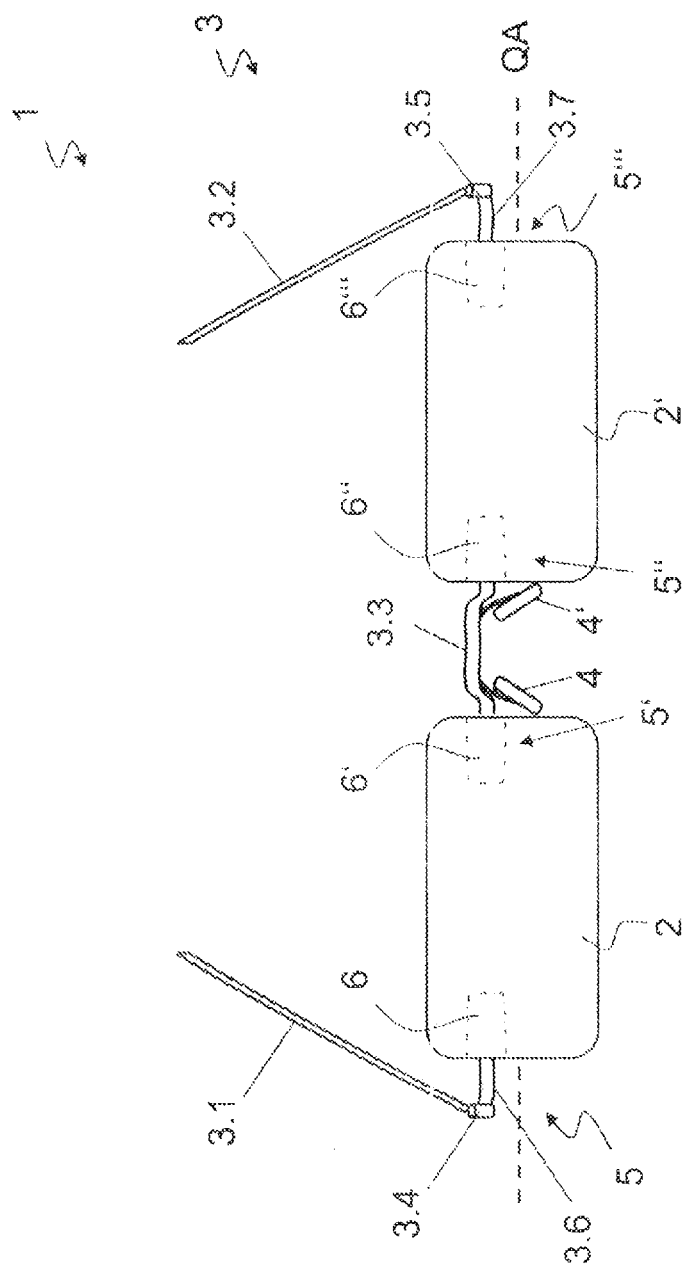

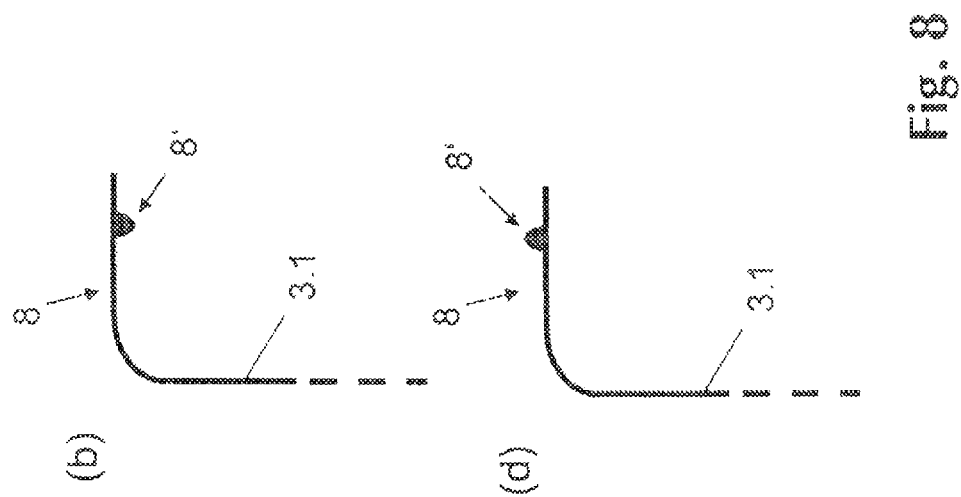
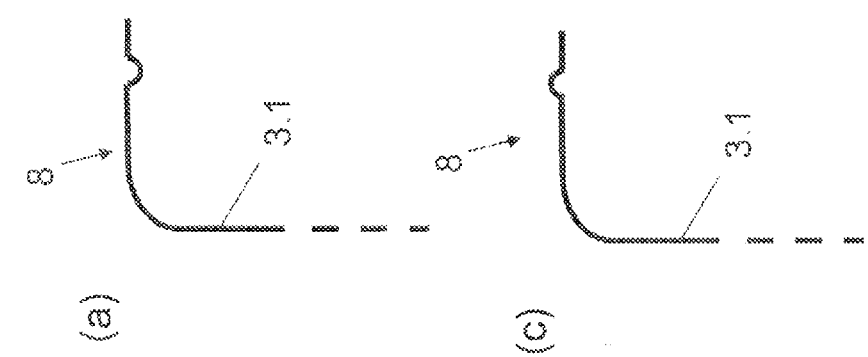
Fig. 8

DEVICE AND METHOD FOR DIRECTLY SECURING AT LEAST ONE TEMPLE, HINGE, AND/OR BRIDGE OF AN EYEGLASS FRAME TO AT LEAST ONE EYEGLASS LENS OF RIMLESS GLASSES

This is the national stage of International Application PCT/DE2014/100048, filed Feb. 11, 2014.

The invention relates to a device for directly securing at least one temple, end-piece and/or bridge of a spectacle frame to at least one spectacle lens of rimless spectacles and an appurtenant method.

BACKGROUND OF THE INVENTION

From the prior art, spectacles without rims, known as rimless spectacles, are extensively known. Such rimless spectacles usually have a spectacle frame comprising several spectacle frame components, preferably a bridge for connecting the two spectacle lenses in the nasal region as well as two spectacle temples, wherein the spectacle temple is connected either directly or via a hinge element and an end-piece to the spectacle lens of the rimless spectacles. In the case of known rimless spectacles the free ends of the bridge and a free end of the temple or the end-piece are secured directly to the spectacle lens, namely by means of a pin element fastened on the spectacle frame element which passes through a bored hole in the spectacle lens and on the opposite side is locked into place with the spectacle lens by means of a securing means.

Disadvantageously, in the case of such direct securing of the spectacle frame components to the spectacle lens of rimless spectacles, the spectacle lens is frequently damaged through unintentional force effects on the spectacle frame. Due to the bore for accommodating the pin element, which extends laterally through the spectacle lens, the force is introduced into the spectacle lens in an essentially point-wise manner and can thereby lead to damage, more particularly breakage of the spectacle lens in the area of the bore.

SUMMARY OF THE INVENTION

On the basis of this, the object of the invention is to provide a device for directly securing at least one temple, end-piece and/or bridge of a spectacle frame to at least one spectacle lens of rimless spectacles which eliminates the drawbacks known from the prior art, and more particularly allows optically minimalistic and extremely stable connection of the spectacle frame component to at least one spectacle lens of rimless spectacles. The object of the invention is achieved based on the features described herein. In addition, the subject matter of the invention is a method of directly securing at least one temple, end-piece and/or bridge of a spectacle framework to at least one spectacle lens of rimless spectacles as described herein.

The essential aspects of the device according to the invention for directly securing at least one temple, one end-piece and/or one bridge of a spectacle frame to at least one spectacle lens of rimless spectacles is seen in that in the recess on the edge a securing body is positively held and firmly connected to the spectacle lens, in that the securing body has a bush-like receiving channel extending along the transverse axis and in that the temple, the end-piece and/or the bridge of the spectacle frame has at least one plug-like connection section which can be inserted into the bush-like receiving channel to produce a detachable plug-type connection. Particularly advantageously, through the positive-fit insertion of the securing body forming a connection bush into the recess of the spectacle lens, rapid and simple direct securing of the spectacle frame component to the spectacle lens of rimless spectacles is made possible. The securing body and the appurtenant spectacle frame components are preferably prefabricated by machine so that the optician can use them in situ without major technical and mechanical effort. Also advantageous is the fact that through the flat connection of each spectacle frame component via a securing body to the spectacle lens of rimless spectacles, the risk of damage to the spectacle lens in the event of unintentional force being applied is considerably reduced. Finally, due to the detachable plug-type connection, spectacle frames with different design can be used for the same spectacle lenses so that a spectacle wearer can adapt the colour and shape of his/her spectacle frame in accordance with his/her current requirements.

Positively receiving of the securing body in the recess is taken to mean the positive-fit insertion of the securing body into the recess extending along the transverse axis of the spectacle lens in such a way that a movement of the securing body in the spectacle lens plane perpendicularly to the transverse axis of the spectacle lens is prevented. Preferably at least one third of the securing body is positively received in the recess.

Also advantageously, the securing body is made of plastic, metal or a combination of plastic and metal, preferably an at least partially transparent plastic material. In a transparent embodiment of the securing body the connection of the spectacle frame to the spectacle lenses of the rimless spectacles is optically almost not visible, so that a minimalistic direct securing for rimless spectacles is produced. In this way the outer contour of the spectacles frames is not interrupted by the spectacle frame securing, but is retained.

Preferably the edge recess has a U or V-shaped cross-section and conically extends along an axis perpendicular to the transverse axis and perpendicular to a lens plane accommodating the spectacle lenses. This produces a particularly stable connection of the spectacle frame components to at least one spectacle lens of rimless spectacles.

Also advantageously, the outer shape of the securing body is adapted to the shape of the edge recess, wherein the securing body inserted into the edge recess is connected flush with the spectacle lens, preferably through adhesion. In this way the recess in the spectacle lens is fully closed, which results in a flush spectacle lens surface.

In a preferred embodiment the bush-like receiving channel extends conically along the transverse axis and the plug-like connection section is formed by at least one free end section of the temple, the end-piece and/or the bridge of the spectacle frame, wherein the plug-like connection section is made of a flat band material, preferably from metal or a metal alloy. Due to the conical nature of the plug-like connection section in the bush-like receiving channel, the detachable plug-type connection can be produced in a particularly user-friendly manner.

Also advantageously the detachable plug-type connection is designed as a snap-in connection. For this the plug-like connection section has a nose section and the securing body has a bore connected with the bush-like receiving channels and/or semi-spherical recess for at least partially receiving the nose section. Also advantageously, the bore can have an internal thread for holding a screw means.

Particularly advantageously the edge recess is open at least to the front side of the spectacle lens and extends at least over a part of this thickness of the spectacle lens from the front side in the direction of the rear side. In the case of lenses of small thickness the edge recess can also be open towards the rear side of the spectacle lens and extend over the entire thickness of the spectacle lens.

Equally, in accordance with an advantageous embodiment the plug-like connection section can be formed by a cap-like connection element which can be mounted on the free end of the respective temple or the end-piece and/or the free ends of the bridge. Advantageously, even existing spectacle temples can be retrofitted with the inventive plug-like connection.

The subject matter of the invention is also a method of directly securing at least one temple, an end-piece and/or a bridge of a spectacle frame to at least one spectacle lens of rimless spectacles, in which in the at least one spectacle lens there is an edge recess that extends along the transverse axis of the spectacle lens. The essential aspect of the method according to the invention is to be seen in the fact that a securing body is positively fitted into the recess and firmly connected to the spectacle lens, wherein the securing body has a bush-like receiving channel extending along the transverse axis and the temple, the end-piece and/or the bridge of the spectacle frame has at least one plug-like connection section, and that to produce a detachable plug-type connection the plug-like connection section is inserted into the bush-like receiving channel. This allows particularly simple and direct assembly of a spectacle frame on the spectacle lens of rimless spectacles.

Particularly advantageously the securing body positively fitted into the edge recess is connected flush with the spectacle lens, preferably through adhesion.

In the sense of the invention the expressions "approximately", "essentially" or "around" mean deviations from the exact value in each case by +/−10%, preferably by +/−5% and/or deviations in the form of changes that are not important for the function.

Further developments, advantages and application possibilities of the invention are set out in the following description of examples of embodiment and in the figures. All the described and/or illustrated features are in themselves or in any combination essentially the subject matter of the invention, irrespective of their summary in the claims or their retrospective application. The content of the claims is also made part of the description.

BRIEF DESCRIPTION OF THE SEVERAL VIEWS OF THE DRAWINGS

The invention will be described in more detail below by way of the figures of examples of embodiments. In these:

FIG. 1 shows a simplified front view of rimless spectacles in accordance with the invention with spectacle temples designed in one piece, FIG. 2 shows a simplified front view of rimless spectacles in accordance with the invention with spectacle temples connected to the spectacle lenses via a hinge and an end-piece, FIG. 8a-d show various variants of embodiment of the plug-like connection section of a spectacle frame component, more particularly the spectacle temple.

DETAILED DESCRIPTION OF THE INVENTION

Figure 4:
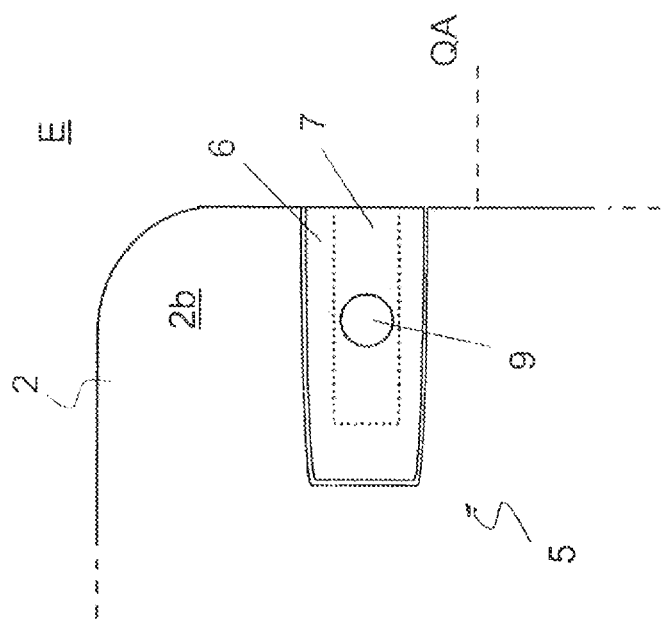
FIG. 4 shows an enlarged view of a section of the rear of the rimless spectacles in accordance with FIG. 1.

FIGS. 1 and 2 each show, as an example, a schematic front view of rimless spectacles 1 comprising two spectacle lenses 2, 2; and a spectacle frame 3 comprising several components.

For example, the spectacle frame 3 shown in FIG. 1 has a first and second temple 3.1, 3.2 as well as a bridge 3.3, wherein on the bridge 3.3 preferably two nose pads 4, 4' are provided for resting the rimless spectacles 1 on the nose of the spectacle wearer. The free end of each temple 3.1, 3.2 is thereby directly connected to the spectacle lens 2, 2'.

In the embodiment variant according to FIG. 2 the free end of the first and second temple 3.1, 3.2 is not directly connected to the spectacle lens 2, 2' but via a first and second hinge element 3.4, 3.5 by means of a first and second end-piece 3.6, 3.7. Thus, in the present example of embodiment the first temple 3.1 is connected in an articulated manner via the first hinge element 3.4 with the first end-piece 3.6, the free end of which is directly connected with the, in a front view, left outer lateral edge of the left spectacle lens 3 of the rimless spectacles 1. In an analogue manner the second temple 3.2 is attached via the second hinge element 3.5 to the second end-piece 3.7, the free end of which is directly connected with the, in a front view, right outer lateral edge of the right spectacle lens 2' of the rimless spectacles 1.

The present invention is not in any way restricted to the forms of embodiment of a spectacles frame 3 shown in FIGS. 1 and 2, but covers all embodiment variants of a spectacles frame 3 which are suitable for directly securing to a spectacle lens 2, 2' of rimless spectacles 1 by means of a free end of part of the spectacle frame 3.

In accordance with the invention the spectacle lenses 2, 2' have at least one edge recess 5, 5', 5", 5'". In the present example of embodiment for each spectacle lens 2, 2', two edge recesses 5. 5', 5", 5'" are provided in the opposite lateral edge areas of the spectacle lenses 2, 2' in order to allow the direct securing of the bridge 3.3 as well as the first and second temple 3.1, 3.2 and/or the first and second end-pieces 3.6, 3.7 to the spectacle lenses 2, 2'.

Figure 10:
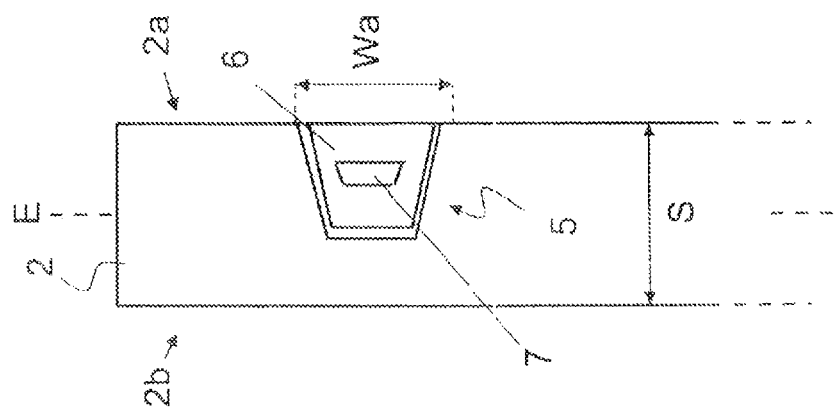
FIG. 10 shows a section along line I-I through the connection area of the spectacle lens in accordance with FIG. 3 with an edge recess extending only partially along the thickness of the spectacle lens.

The edge recesses 5, 5', 5", 5'" extend along the transverse axis QA of the rimless spectacles 1, preferably over the complete thickness S of the spectacle lens 2, 2', i.e. from the front side 2a to the rear side 2b of the spectacle lens 2, 2', wherein the transverse axis QA extends in a lens plane E accommodating the spectacle lenses 2, 2'. In the case of spectacle lenses with high thicknesses S the edge recess 5, 5', 5", 5'" is at least open to the front 2a of the spectacle lens 2, 2' and extends, as shown in the variant of embodiment illustrated in FIG. 10, at least over part of the thickness S of the spectacle lens 2, 2' from the front side 2a in the direction of the rear side 2b.

Figure 5:
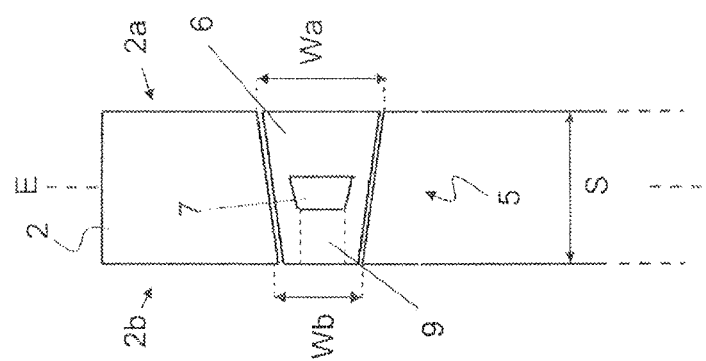
FIG. 5 shows a section along line I-I through the connection area of the spectacle lens in accordance with FIG. 3.

In accordance with the variant of embodiment shown in FIG. 5, the edge recess 5, 5', 5", 5'" is also open to the rear side 2b of the spectacle lens 2, 2' and thus extends over the entire thickness S of the spectacle lens 2, 2'. This results in a continuous aperture in the spectacle lens 2, 2' which is open on the side and is outside the primary field of vision. Preferably the edge recesses 5, 5', 5", 5'" each have the same cross-sectional shape, namely a U- or V-shaped or trapezoidal cross-section.

According to the invention, the edge recesses 5, 5', 5", 5'" are designed for the positive-fit accommodation of a securing body 6, 6', 6", 6'". The securing body 6, 6', 6", 6'" held in the edge recess 5, 5', 5", 5'" in a positive-fit manner is firmly connected to the spectacle lens, preferably adhered or welded thereto. For this, the securing body 6, 6', 6", 6'" is inserted into the respective edge recesses 5, 5', 5", 5'" in the spectacle lenses 2, 2' in such a way that a flush transition between the outwardly directed surfaces of the securing body 6, 6', 6", 6'" and the adjoining surface area of spectacle lens 2, 2' incorporating the edge recess 5, 5', 5", 5'" is produced. In a preferred variant of embodiment, the securing body 6, 6', 6", 6'" therefore fills the respective recess 5, 5', 5", 5'" completely so that a spectacle lens 2, 2' with a closed rim is produced. The securing body 6, 6', 6", 6'" is at least accommodated in the edge recess 5, 5', 5", 5'" in such a way that it is flush, or approximately flush with the front side 2a of the spectacle lens 2.

The securing body 6, 6', 6", 6'" is made of metal, plastic or a combination of metal and plastic for example. In a preferred embodiment variant at least partially transparent plastic material is used. In the case of completely transparent plastic material an optical impression of a solid lens surface is given, particularly also in the area of the recesses 5, 5', 5", 5'" of the spectacle lenses 2, 2'.

Figure 3:
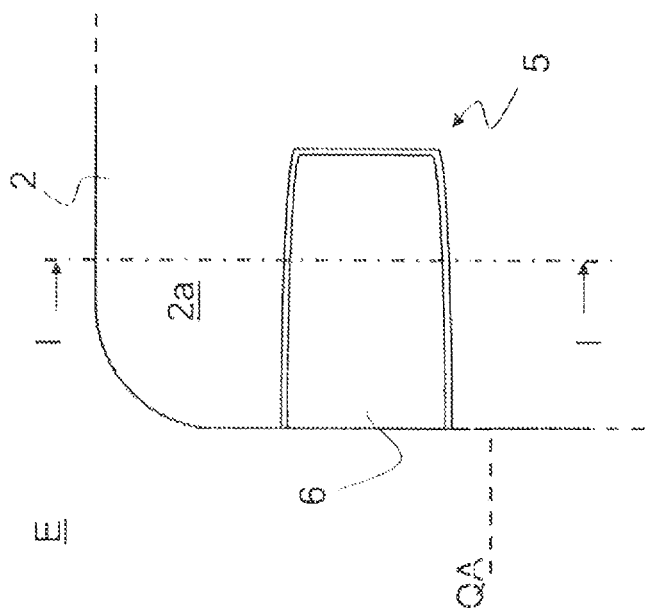
FIG. 3 shows an enlarged view of a section of the front of a spectacle lens of the rimless spectacles in accordance with FIG. 1.

In FIGS. 3 and 4, in an enlarged view of a section seen from above, the lateral securing area of the front side 2a and rear side 2b of the spectacle lens 2 in accordance with FIGS. 1 and 2 is shown, where the securing body 6 is already accommodated in the edge recess 5. The positively adjoining surface sections of the securing body 6 are adhered to the inner surfaces of the edge recess 5 of the spectacle lenses.

FIG. 5 shows a section along axis I-I through the securing area of the spectacle lens 2 comprising the recess 5 in accordance with FIG. 3. The front side 2a of the spectacle lens facing away from the spectacle wearer and the rear side 2b of the spectacle lens 2 facing the spectacle wearer have a different opening width of the edge recess 5, namely the opening width Wa of the recess 5 on the front side 2a is larger than the opening width Wb of the recess 5 on the rear side 2b of the spectacle lens 2. The recess 5 thereby tapers conically along an axis perpendicular to the transverse axis QA and spectacle plane E. The upper and underside of the securing body 6 are adapted accordingly so that they also taper conically.

Figure 7:
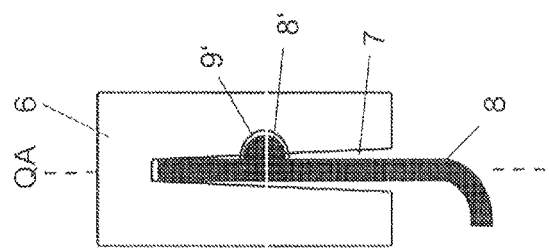
FIG. 7 shows a longitudinal section through a second variant of embodiment of the securing body.
Figure 6:
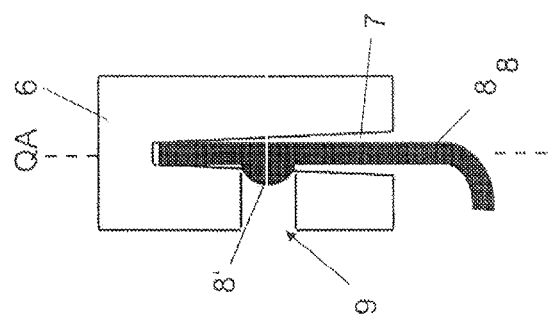
FIG. 6 shows a longitudinal section through a first variant of embodiment of the securing body.

As examples, in FIGS. 6 and 7 a longitudinal section through two embodiment variants of the securing body 6 are shown. In accordance with the invention, in the securing body a bush-like receiving channel 7 is provided which extends along the transverse axis, and which to produce a detachable plug-type connection is designed with at least one plug-like connection section 7 of the temple 3.1, 3.2, the end-piece 3.6, 3.7 and/or the bridge 3.3 of the spectacle frame 3. For this, the plug-like connection section 8 of the temple 3.1, 3.2, of the end-piece 3.6, 3.7 and/or of the bridge 3.3 of the spectacle frame 3 can be introduced via an edge opening into the bush-like receiving channel 7.

In terms of its shape and dimensions, the bush-like receiving channel 7 is adapted to the plug-like connection section 8, which is preferably formed by the free end section of the temple 3.1, 3.2, the end-piece 3.6, 3.7 and/or the bridge 3.3 of the spectacle frame 3. Preferably the bush-like receiving channel 7 tapers conically along the transverse axis QA and/or an axis perpendicular to the transverse axis QA and the lens plane E in order to allow simpler insertion of the plug-type connection section 8 into the bush-like receiving channel 7. The bush-like receiving 7 is essentially elongated in shape.

In order to produce a snap-in connection, in the securing body 6 a bore 9 (FIG. 6) running perpendicularly to the transverse axis QA and the lens plane E or a semi-spherical recess 9' (FIG. 7) can be provided, which extends from the bush-like receiving channel 7 to the rear side 2b of the spectacle lens 2 or to the front side 2a. The bore 9/semi-spherical recess 9' is envisaged for receiving a nose section 8' provided on a plug-like connection section 8 and projecting laterally from it. After full insertion of the plug-like connection section 8 into the bush-like receiving channel, the nose section 8' of the plug-like connection section 8 at least in sections engages in the bore 9 or the semi-spherical recess 9' and thus prevents unintentional loosening of the plug-type connection. Only by applying a predetermined tensile force the described snap-in connection may be released again.

In FIG. 8(a) to (d) four different forms of embodiment of such as plug-like connection section 8 with nose section 8' are shown as examples for the free end of a temple 3.1. The plug-like connection section 8 is preferably made of a flat band material, preferably a metal or metal alloy, in which for forming the nose section 8' a semi-circular bend is introduced. Alternatively, the nose section 8' may be formed by applying a semi-spherical material section and firmly connecting it to the band-like material. The nose section 8' can project laterally either in the direction of the front or rear side 2a, 2b of the spectacle lens from the otherwise essentially planar or straight plug-like connection section 8.

In a further variant of embodiment, the bore 9 has an internal thread, via which a screw means can be screwed into the bore 9 in order to ensure additional securing of the plug-like connection section 8 in bush-like receiving channel 7 and thereby in the securing body 6, 6', 6", 6'".

Figure 9:
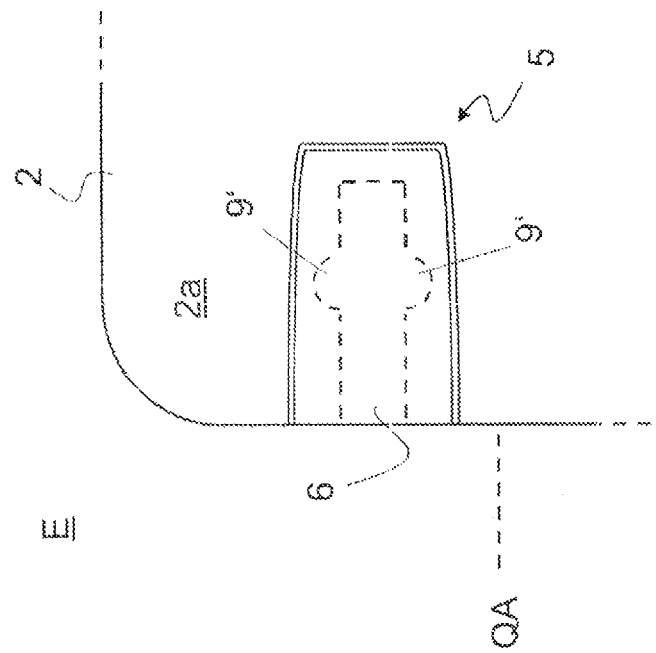
FIG. 9 shows an enlarged view of a section of the front of a spectacle lens of the rimless spectacles in accordance with FIG. 1 in an alternative variant of embodiment.
Figure 12:
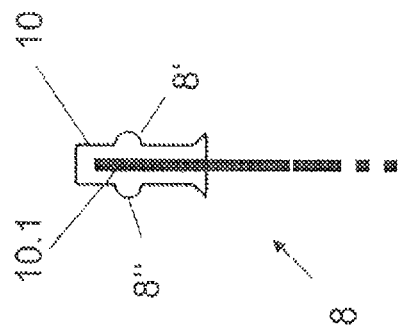
FIG. 12 shows an alternative variant of embodiment of the plug-type connection section with a cap-like connection element.
Figure 11:
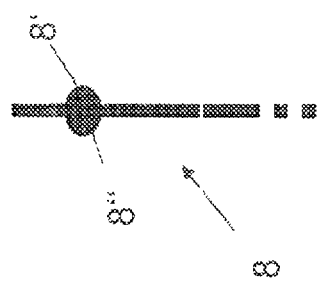
FIG. 11 shows a variant of embodiment of the plug-like connection section of a spectacle frame component, more particularly the spectacle temple, for use in the variant of embodiment in accordance with FIG. 9

In an further variant of embodiment in accordance with FIG. 9, two semi-spherical recesses 9' can also be provided, for example, which extend in or parallel to the lens plane E. FIGS. 11 and 12 show further variants of embodiment of the plug-like connection section 8 with two nose section 8', 8" for producing a plug-type connection with the variant of embodiment of the securing body 6 in accordance with FIG. 9. The plug-like connection 8 is again preferably made of a flat band material, preferably metal or a metal alloy, and the two nose sections 8', 8" are built by the application of a semi-spherical material section and firmly fastening it to the band-like material. The nose sections 8', 8" thus extend perpendicularly to the upper and lower side of the temple.

In an alternative variant of embodiment, the plug-like connection section 8 is formed by a cap-like connection element 10, which can be mounted on the free end of the respective temple 3.1, 3.2, or end-piece 3.6, 3.7 and/or the free ends of the bridge 3.3. Preferably the cap-like connection element 10 is designed as a plastic component, more particular an injection-moulded plastic component and has an inner receiving channel 10 for receiving the free end. The outer shape of the cap-like connection element 10 is matched to the inner shape of the bush-like receiving channel 7 of the securing body 6, 6', 6", 6''', and forms, for example, two laterally projecting nose sections 8', 8". Furthermore, either on the free end of the respective temple 3.1, 3.2 or the respective end-piece 3.6, 3.7 and/or on the free ends of the bridge 3.3, securing means can be provided which secure the cap-like connection element 10 from being unintentionally pulled off the free end. This can be formed, for example by a hook-like profiling of at least sections of the outer surface of the free end.

The invention has been described above using examples of embodiment. It should be understood that numerous variations as well as derivations are possible without departing from the inventive idea on which the invention is based.

LIST OF REFERENCE NUMBERS

1. Rimless spectacles
2, 2' Spectacle lenses
2a Front side
2b Rear side
3 Spectacle frame
3.1 First temple
3.2 Second temple
3.3 Bridge
3.4 First hinge element
3.5 Second hinge element
3.6 First end-piece
3.7 Second end-piece
4, 4' Nose pads
5, 5', 5", 5''' Edge recess
6, 6', 6", 6''' Securing body
7 Plug-like connection section
8', 8" Nose section
9 Bore
9' Semi-spherical recess
10 Cap-like connection element
10.1 Inner receiving channel
QA Transverse axis
E Lens plane
S Lens thickness
Wa Opening width front side
Wb Opening width rear side

The invention claimed is:

1. Device for directly securing at least one temple (3.1, 3.2), one end-piece (3.6, 3.7) and/or one bridge (3.3) of a spectacle frame (3) to at least one spectacle lens (2, 2') of rimless spectacles (1), wherein the at least one spectacle lens (2, 2') has at least one edge recess (5, 5', 5", 5''') which extends along the transverse axis (QA) of the spectacle lens (2, 2'), characterised in that in the edge recess (5, 5', 5", 5''') a securing body (6, 6', 6" 6''') made of plastic is accommodated in a positively fitting manner and is firmly connected flush with the spectacle lens (2, 2') by adhesion, in that the securing body (6, 6', 6", 6''') has a bush-like receiving channel (7) extending along the transverse axis (QA), and in that the temple (3.1, 3.2), the end-piece (3.6, 3.7) and/or the bridge (3.3) of the spectacle frame (3) comprise at least one plug-like connection section (8), which is formed by at least one free end section of said temple (3.1, 3.2), end-piece (3.6, 3.7) and/or bridge (3.3), which is made of a flat band metal material and which can be inserted into the bush-like receiving channels (7) to produce a detachable plug-type connection in the form of a snap-in connection.

2. Device according to claim 1 characterised in that the securing body (6, 6', 6", 6''') is made of an at least partially transparent plastic material.

3. Device according to claim 1 characterised in that the edge recess (5, 5', 5", 5''') has a U or V-shaped cross-section.

4. Device according to claim 3 characterised in that the outer shape of the securing body (6, 6', 6", 6''') is adapted to the shape of the edge recess (5, 5', 5", 5''').

5. Device according to claim 1 characterised in that the edge recess (5, 5', 5", 5''') tapers conically along an axis perpendicular to the transverse axis QA and perpendicular to a lens plane (E) accommodating the spectacle lenses (2, 2').

6. Device according to claim 1 characterised in that the bush-like receiving channel (7) tapers conically along the transverse axis (QA).

7. Device according to claim 1 characterised in that the plug-like connection section (8) is made of a metal alloy.

8. Device according to claim 1 characterised in that the plug-like connection section (8) comprises at least one nose section (8', 8").

9. Device according to claim 8 characterised in that the securing body (6, 6', 6", 6''') has a bore (9) connected with the bush-like receiving channel (7) and/or at least one semi-spherical recess (9') for at least partially accommodating a nose section (8', 8").

10. Device according to claim 9 characterised in that the bore (9) comprises an internal thread for receiving a screw means.

11. Device according to claim 1 characterised in that the edge recess (5, 5', 5", 5''') is open at least towards the front side (2a) of the spectacle lens (2, 2') and extends at least over a part of the thickness (S) of the spectacle lens (2, 2') from the front side (2a) in the direction of the rear side (2b).

12. Device according to claim 11 characterised in that the edge recess (5, 5', 5", 5''') is also open towards the rear side (2b) of the spectacle lens (2, 2') and extends over the entire thickness (S) of the spectacle lens (2, 2').

13. Device according to claim 1 characterised in that plug-like connection section (8) is formed by a cap-like connection element (10) which can be mounted on the free end of the respective temple (3.1, 3.2), the respective end-piece (3.6, 3.7) and/or the free ends of the bridge (3.3).

14. Method of directly securing at least one temple (3.1, 3.2), one end-piece (3.6, 3.7) and/or one bridge (3.3) of a spectacle frame (3) to at least one spectacle lens (2, 2') of rimless spectacles (1), wherein at least one edge recess (5, 5', 5", 5''') extending along the transverse axis (QA) of the spectacle lens (2, 2') is introduced into at least one spectacle lens (2, 2'), characterised in that a securing body (6, 6', 6" 6''') made of plastic is inserted in a positively fitting manner into the edge recess (5, 5', 5", 5''') and is firmly connected flush with the spectacle lens (2, 2') by adhesion, wherein the securing body (6, 6', 6", 6''') has a bush-like receiving channel (7) extending along the transverse axis (QA), and the temple (3.1, 3.2), the end-piece (3.6, 3.7) and/or the bridge (3.3) of the spectacle frame (3) have at least one plug-like connection section (8), which is formed by at least one free end section of said temple (3.1, 3.2), end-piece (3.6, 3.7) and/or bridge (3.3), which is made of a flat band metal material and, and in that the plug-like connection section (8) is inserted into the bush-like receiving channel (7) to produce a detachable plug-type connection in the form of a snap-in connection.

* * * * *